United States Patent [19]

April et al.

[11] Patent Number: 5,050,058
[45] Date of Patent: Sep. 17, 1991

[54] FAMILY OF POWER CONVERTERS USING RECTIFIER TRANSFORMERS CONNECTED IN SERIES ON THE PRIMARY SIDE

[75] Inventors: Georges-Emile April; Guy Olivier, both of Montreal, Canada

[73] Assignee: LaCorporation DeL'ecole Polytechnique, Montreal, Canada

[21] Appl. No.: 567,948

[22] Filed: Aug. 14, 1990

[51] Int. Cl.$^5$ .............................................. H02M 7/06
[52] U.S. Cl. ......................................... 363/65; 363/43; 363/126; 336/5; 336/170; 336/180
[58] Field of Search ............... 363/43, 65, 67, 68, 363/69, 126, 129, 58, 82; 336/5, 170, 180, 182, 215, 220

[56] References Cited

U.S. PATENT DOCUMENTS

| | | |
|---|---|---|
| 3,573,602 | 4/1971 | Jensen . |
| 4,208,709 | 6/1980 | Garnham et al. . |
| 4,493,016 | 1/1985 | Cham et al. ......................... 363/126 |
| 4,663,702 | 5/1987 | Tanaka . |

Primary Examiner—Steven L. Stephan
Assistant Examiner—Emmanuel Todd Voeltz
Attorney, Agent, or Firm—Fishman, Dionne & Cantor

[57] ABSTRACT

At least two three-phase transformer arrangements include a plurality of primary windings connected in a wye configuration and at least two converter arrangements, each converter arrangement comprising a plurality of secondary windings connected in a double-wye configuration. A separate rectifier is connected in series with each secondary winding of each converter arrangement.

6 Claims, 8 Drawing Sheets

FAMILY OF POWER CONVERTERS USING RECTIFIER TRANSFORMERS CONNECTED IN SERIES ON THE PRIMARY SIDE

BACKGROUND OF INVENTION

1. Field of the Invention

The invention relates to a novel power converter apparatus. More specifically, the invention relates to such apparatus having two or more converter arrangements, each converter arrangement being formed in a double-wye configuration.

2. Description of Prior Art

In conventional converter apparatus, when output current exceeds a certain level, it is no longer feasible to use only a single rectifier device (diode, thyristor, etc.) in each current path. Instead, several rectifier devices must be paralleled in order to avoid reaching the melt down current of the rectifiers in each current path.

However, such paralleling of rectifier devices is not a trivial task. The devices must be selected to have substantially identical characteristics. Resistors, inductors, or other components must be added to ensure current sharing. Furthermore, the physical lay-out and the arrangement of the rectifiers becomes critical.

Even if proper current distribution can be obtained at the time that the converter apparatus is first installed, the rectifier devices and other current elements will age differently so that after several years of operation, the current sharing will deteriorate and failures will occur. Since the rectifier devices must be matched, all such rectifier devices of the stack where the fault occurred must be replaced by a new set of, once again, carefully selected rectifier devices. Such failures typically occur much more frequently than predicted by the MTBF (mean time between failure) of the rectifiers. In fact, they are not caused by a problem in the rectifier devices, but rather, by circuit problems. Because of this, good current sharing cannot be ensured over a long period of time.

Examples of patents of interest having regard to the subject matter of the present application are Jensen U.S. Pat. No. 3,573,602, Apr. 6, 1971, Garnham et al U.S. Pat. No. 4,208,709, June 17, 1980 and Tanaka U.S. Pat. No. 4,663,702, May 5, 1987. The Jensen patent teaches a plurality of inverters connected in parallel. However, each leg consists of only a single primary. The Garnham et al patent describes, especially in FIG. 6, parallel connected converters. Once again, the transformer of each converter seems to consist of a simple transformer rather than a complex transformer. In addition, although the patent does teach a series connection of transformer primaries, the series connection is used to effectively increase the apparent switching frequency of a pulse width modulated converter as seen from an AC inductor which, as indicated in claim 1 of the patent, constitutes an essential part of any embodiment of the invention of this patent. The present invention makes no use of an AC side reactor nor does it in any way relate to pulse width modulated converters. Rather, the present invention is aimed at powering large direct current loads by allowing a multitude of simple phase controlled converters or uncontrolled rectifiers to be directly paralleled without any need for interphase transformers or AC side inductors. The circuit complexity which would normally be required to guarantee efficient load sharing among the converters is totally eliminated by the proposed primary interconnections. This results in much increased reliability as well as increased efficiency. Further, the proposed multi-phase connection of the present invention naturally results in increased ripple frequency and reduced ripple amplitude making it possible to substantially eliminate any filtering of the input currents or at least allow a simple capacitive filter to reduce current harmonics below acceptable levels.

SUMMARY OF INVENTION

It is therefore an object of the invention to overcome disadvantages of prior art power converter apparatus.

It is a more specific object of the invention to provide such power converter apparatus which includes at least two converter arrangements, and which forces predictable and acceptable current distribution at the output.

In accordance with the invention, there is provided a power converter apparatus comprising:

at least two three-phase transformer arrangements including primary winding means and secondary winding means;

said primary winding means comprising a plurality of windings connected in a wye configuration;

said secondary winding means comprising at least two converter arrangements, each converter arrangement comprising a plurality of secondary windings connected in a double-wye configuration;

a separate rectifier connected in series with each secondary winding of each said converter arrangements.

BRIEF DESCRIPTION OF DRAWINGS

The invention will be better understood by an examination of the following description, together with the accompanying drawings, in which.

DESCRIPTION OF PREFERRED EMBODIMENTS

Numbering System

Transformer

Whenever reference is made to a transformer, it must be understood that this refers to either a three phase transformer of suitable construction (allowing homopolar flux), or to an ensemble of three or six single phase transformers connected to provide the function of a three phase transformer, as is well known to one skilled in the art.

The transformers are numbered 1 to n. The number one being at the neutral point.

Transformer primary winding

A four digit codes is used: ABCD where
A: letter p for primary
B: transformer number; 1,2,3 ...
C: letter X,Y,Z corresponding on the column on which the winding is located
D: if any, winding number, 1,2,3,4, ... if more than one primary winding is located on this column.

Transformer secondary winding

A four digit codes is used: ABCD where
A: letter S for secondary
B: transformer number; 1,2,3 ...
C: letter X,Y,Z corresponding on the column on which the winding is located
D: winding number, 1,2,3,4, ...

Semiconductor

A three digit code is used: ABC where
A: letter Q for thyristor or diode
B: transformer number, the number of the transformer to which the semiconductor is connected
C: sequence number, 1 to 6; in usual operation the devices are conducting in sequence as numbered. (This supposes a direct phase sequence.

Figure 1:
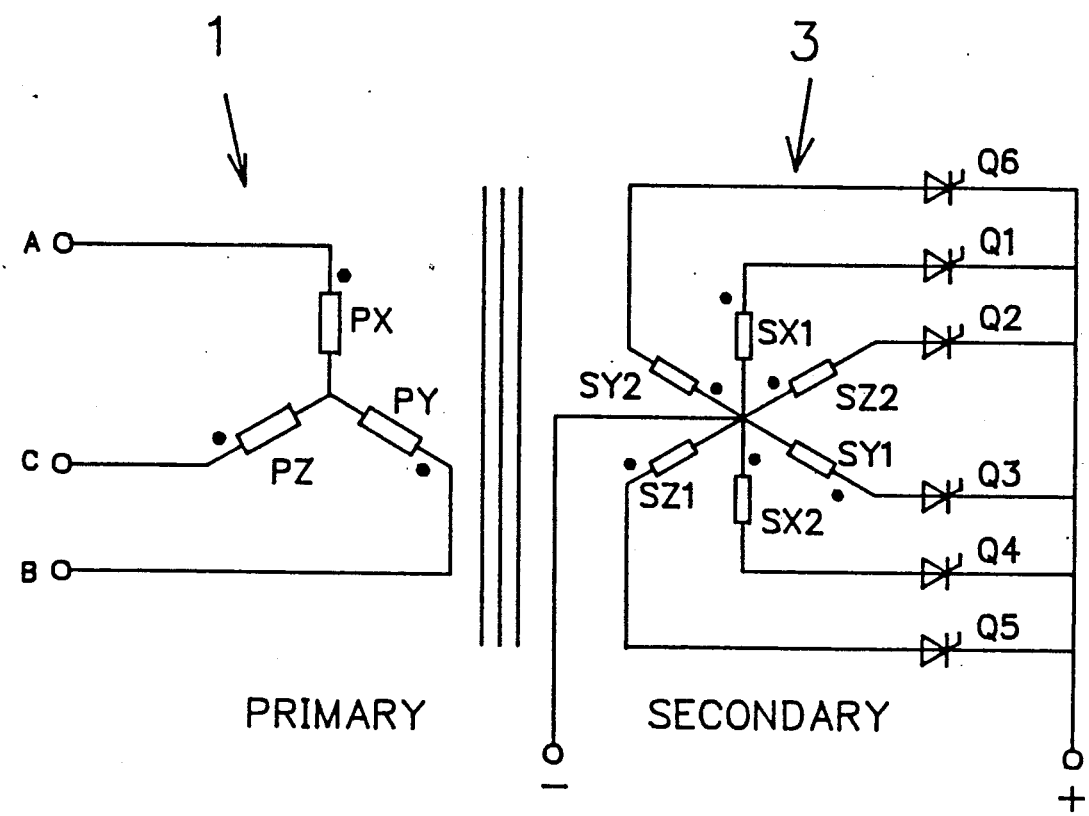
FIG. 1 illustrates a prior art converter apparatus an understanding of the operation of which is useful in understanding the operation of the inventive converter apparatus.

Referring to FIG. 1, the illustrated prior art converter apparatus comprises a primary winding means 1 and a secondary winding means 3. The primary winding means comprises primary windings PX, PY and PZ. As can be seen, the windings are connected in a wye configuration having three legs. The first ends of each leg are connected to each other, and the second ends of the legs are connected, respectively, to terminals A, B and C. Terminals A, B, C are connected, as is well known in the art, to a source of three phase power.

The secondary winding means comprises secondary windings SX1, SX2, SY1, SY2, SZ1 and SZ2. The windings are connected in a double-wye (or "STAR") configuration comprising six legs. The first ends of all the legs are connected to each other at a first common point. The second ends of each leg are connected to a first end of rectifier means, for example, thyristors Q1, Q2, Q3, Q4, Q5, and Q6. The second ends of the thyristors are connected to a second common point. The common point of the second ends of the thyristors constitutes the positive output terminal of the DC output, and the common point of the double-wye legs constitutes the negative terminal of the DC output.

It will be apparent to one skilled in the art that, in all embodiments, the semiconductors may be reversed with resultant reversal of polarities.

In the circuit illustrated in FIG. 1, two thyristors are always in conduction. Each thyristor conducts for 120 electrical degrees and carries half the current output. This compares to a conventional rectifier circuit (i.e., with primary connected in delta) where each semiconductor conducts for periods of 60 electrical degrees during which it carries the full DC current.

With the circuit connected as illustrated in FIG. 1, the output current is forced to split in two as a result of the primary connection. For example, suppose that Q1 is in conduction. The current flowing in thyristor Q1 must also flow in the winding SX1. In order to have ampere-turns compensation, a current must also flow in the primary winding PX. However, this current must also flow through another primary winding in order to close the primary loop (Kirchhoff's law). Thus, either PY or PZ will carry current. This current will produce ampere-turns which, according to basic transformer law, must be compensated by a secondary current. Therefore, Q6 and Q2 must also conduct. Since all windings are identical, each thyristor will carry the same current, i.e., half the DC current, in order that the ampere-turn law be satisfied.

Figure 2:
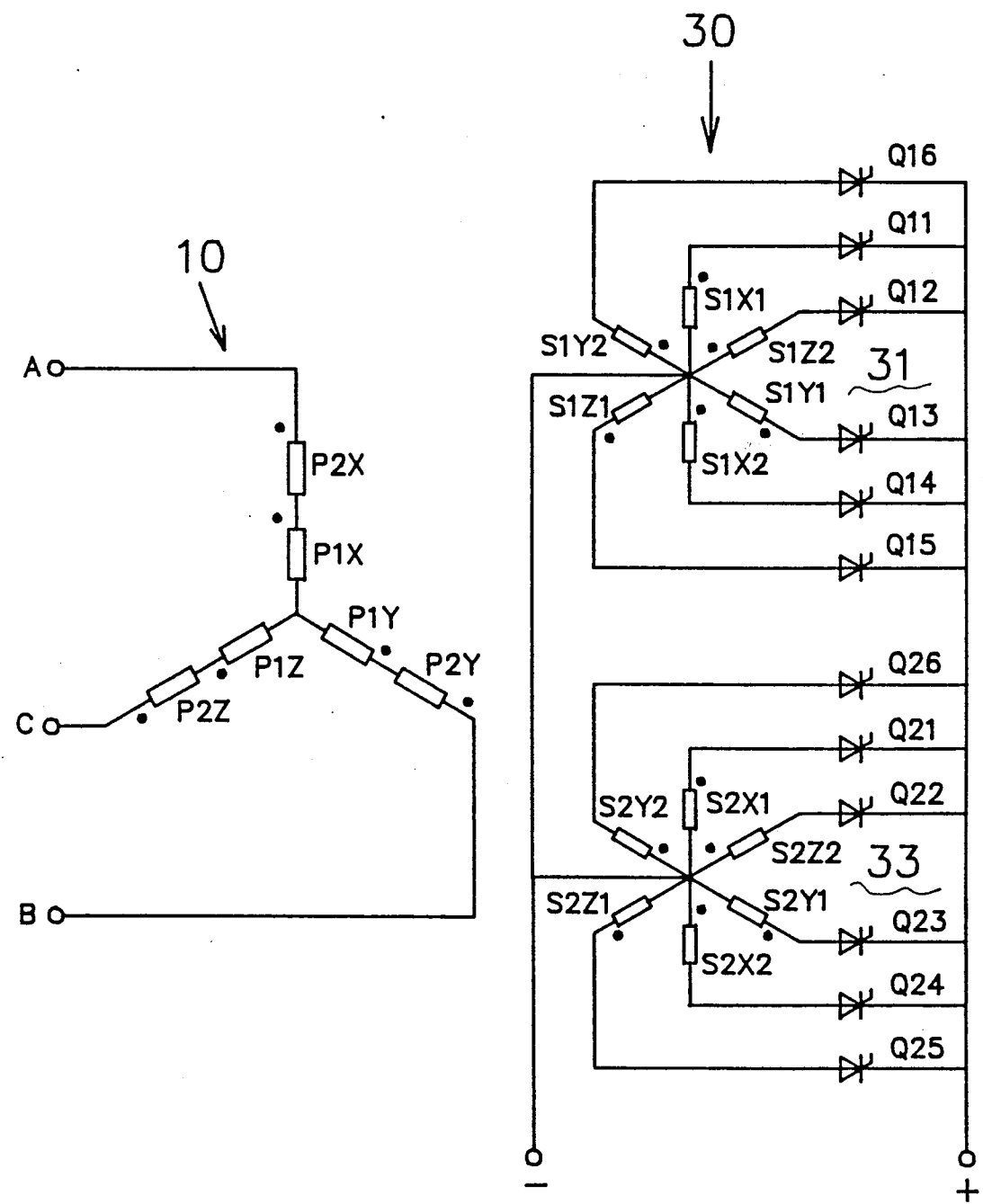
FIG. 2 illustrates a two-transformer wye/double-wye six-pulse converter apparatus in accordance with the invention.

Turning now to FIG. 2, FIG. 2 illustrates both an embodiment of the invention as well as the general principles thereof. Once again, the converter apparatus illustrated in FIG. 2 comprises primary winding means 10 and secondary winding means 30. The primary winding means is once again connected in a wye configuration. However, in the secondary winding means, there are at least two (in FIG. 2 exactly 2) converter arrangements 31 and 33. Each of the converter arrangements is, once again, connected in a double-wye configuration.

As there are two converter arrangements, it is necessary to have two independent three-phase transformers. In accordance with the invention, the primaries of the transformers are serially wound. Thus, each leg of the wye configuration 10 includes two serially wound primary winds, (P1X, P2X), (P1Y, P2Y), and (P1Z, P2Z).

As can also be seen, the converter arrangements 31 and 33 are paralleled, so that, instead of paralleling rectifier devices, it is the entire converter arrangements which are paralleled.

With this arrangement, the series connection of the primary windings forces the current to be divided between the two converters. If, for example, current is flowing in Q11 and winding S1X1, primary current flows, as in the previous case, through winding P1X and through P1Y or P1Z forcing Q16 or Q12 to conduct. This current must also circulate through two primary windings of the second transformer therefore forcing Q21 and Q26 or Q22 into conduction. Thus, at any time, four rectifiers or thyristors are conducting, each of them carrying one quarter of the DC current. This arrangement, however, does not modify the capacity in kVA of the transformer. The transformer is only divided into two units of half the capacity.

Thus, in accordance with the general principles of the invention, the converter appratus will include a plurality of two or more converter arrangements, each converter arrangement being connected in a double-wye configuration. The converter arrangements are paralleled.

An independent three-phase transformer must be provided for each converter arrangement, and the primary windings of the transformers are serially wound.

Once again, the double-wye configurations of the converter arrangement have six legs, a first end of each of the legs in each converter arrangement being connected to each other at a common point, and the common points of all of the converter arrangements being connected together to form the negative terminal of the DC output of the converter apparatus. The other ends of the legs of the double-wye configurations are each connected to a first end of a respective rectifier, for example, a thyristor, the second ends of the rectifiers being connected to each other to form the positive terminal of the DC output.

Figure 3:
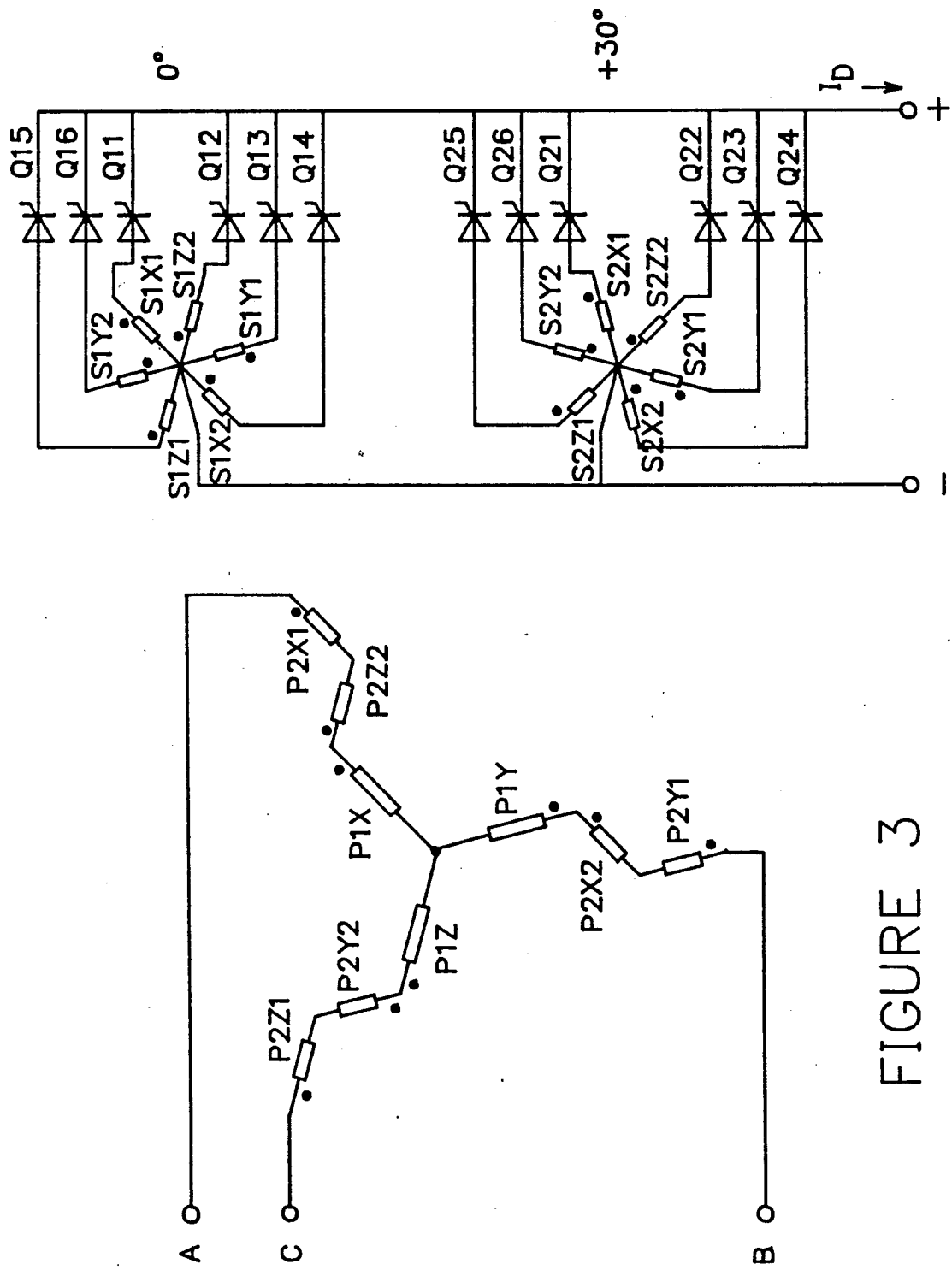
FIG. 3 illustrates a two-transformer wye/double-wye 12-pulse converter apparatus in accordance with the invention.

Turning now to FIG. 3, the 12pulse converter apparatus illustrated therein once again consists of two six-thyristor double-wye converter arrangements with series connections of their primary windings. Once again, two independent three-phase transformers are necessary. The first transformer has a three winding wye connected primary while the second has a six winding zig-zag connected primary. The number of turns of the two sections of the primary windings of the second transformer are chosen to produce a 30 electrical degrees phase-shaft.

The embodiment illustrated in FIG. 3 is similar to the embodiment illustrated in FIG. 2 except for the fact that the primary windings have been complicated. The simple winding of the second transformer was replaced by a zig-zag winding. This was done in order to increase the pulse number of the converter apparatus from 6 to 12. This increase of the pulse number has a tremendous benefical effect on the DC ripple and on the input harmonics. Another consequence of this connection is on the period of conduction of the thyristors which increases from 120 electrical degrees to 150 electrical degrees. At any given instant of time, five thyristors are in conduction. However, contrary to the six-pulse converter apparatus, not all of the thyristors carry the same current. Increasing the period of conduction also allows smaller rectifier devices to be selected. All of these advantages have been obtained at the cost of adding to the complexity of the primary windings and increasing by a small percentage (due to the zig-zag winding) the kVA rating of the second transformer. However, this is a very small cost to pay for the gains obtained by the increase of the pulse number.

Figure 4:
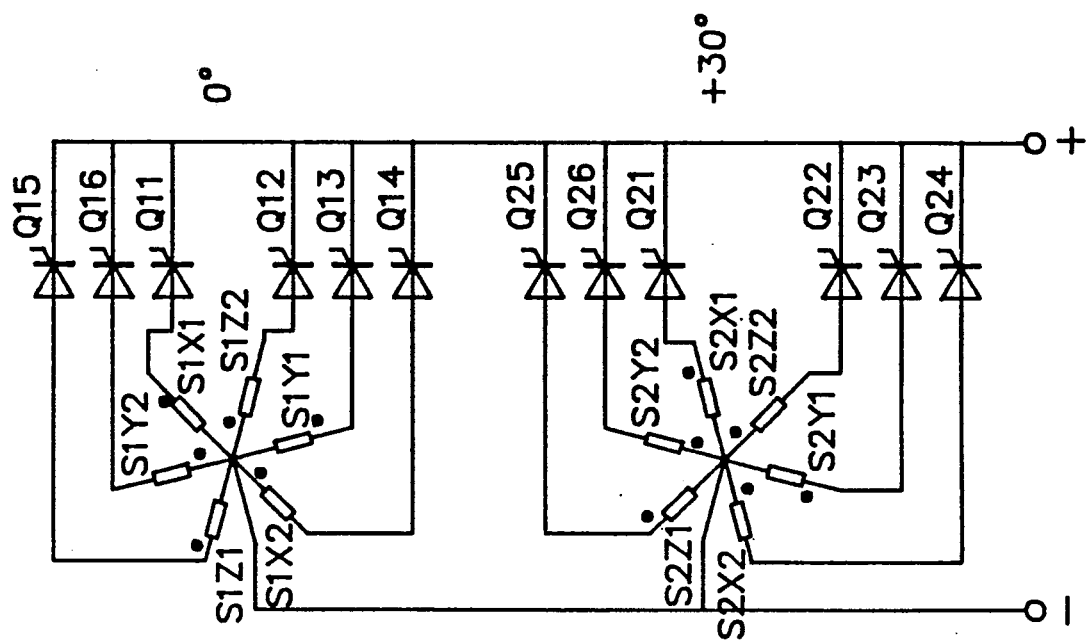
FIG. 4 illustrates a second embodiment of a 12-pulse wye/double-wye converter apparatus in accordance with the invention.
Figure 4:
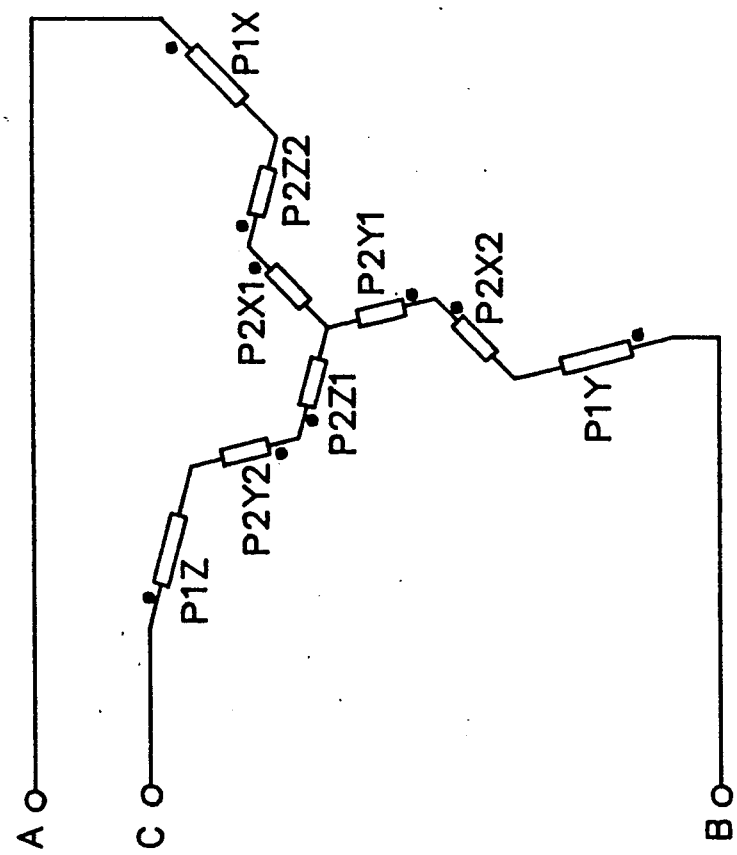

Referring now to FIG. 4, the embodiment illustrated therein is identical to the embodiment illustrated in FIG. 3 except that the primary windings of the two transformers are interchanged. Specifically, in FIG. 4, the first transformer bears the zig-zag winding.

Figure 5:
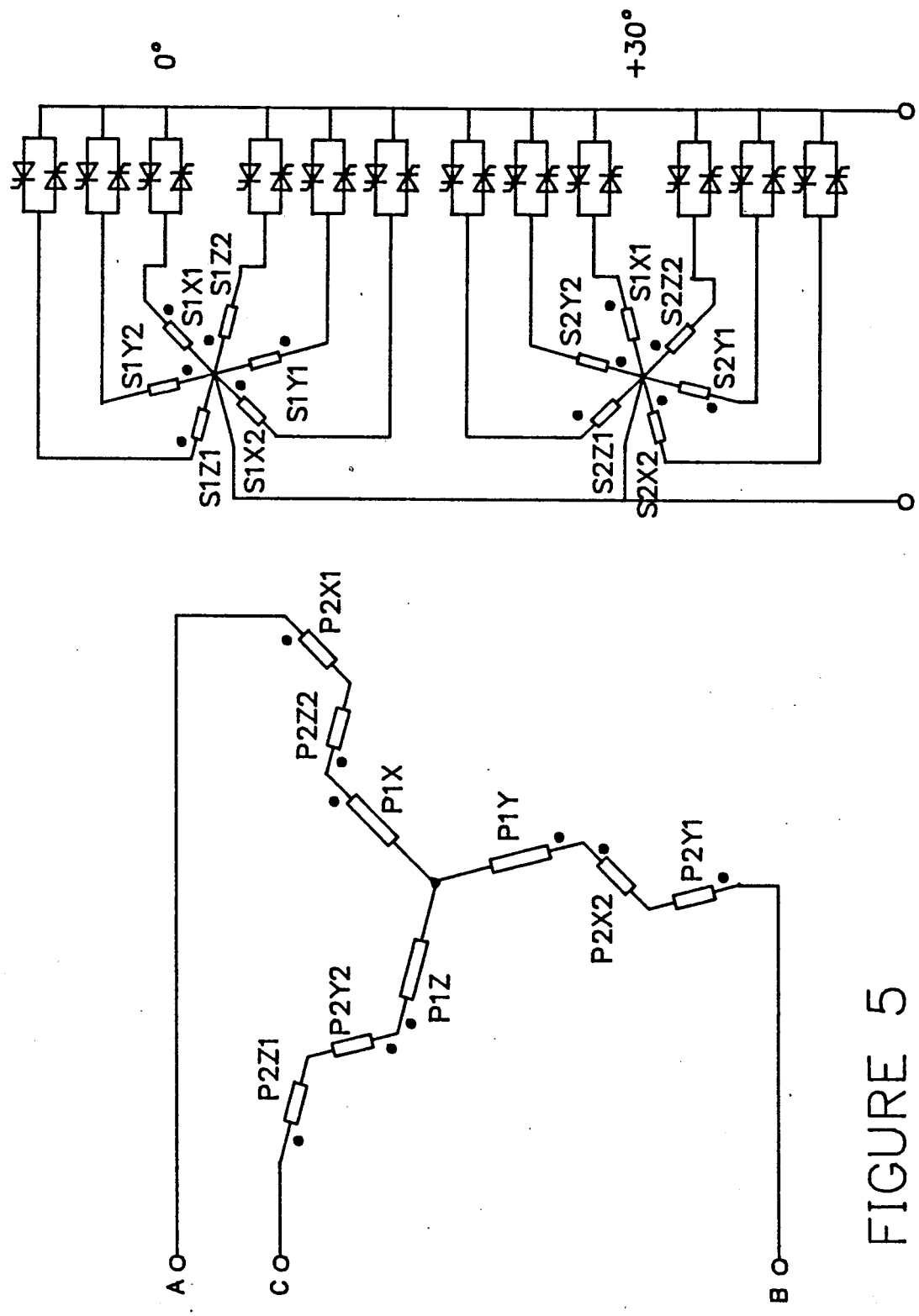
FIG. 5 illustrates a 12-pulse wye/double-wye bidirectional converter apparatus in accordance with the invention.

The embodiment illustrated in FIG. 5 is a bidirectional version of the embodiment illustrated in FIG. 4. This apparatus can be employed when bidirectional output voltage and current are required.

Figure 6:
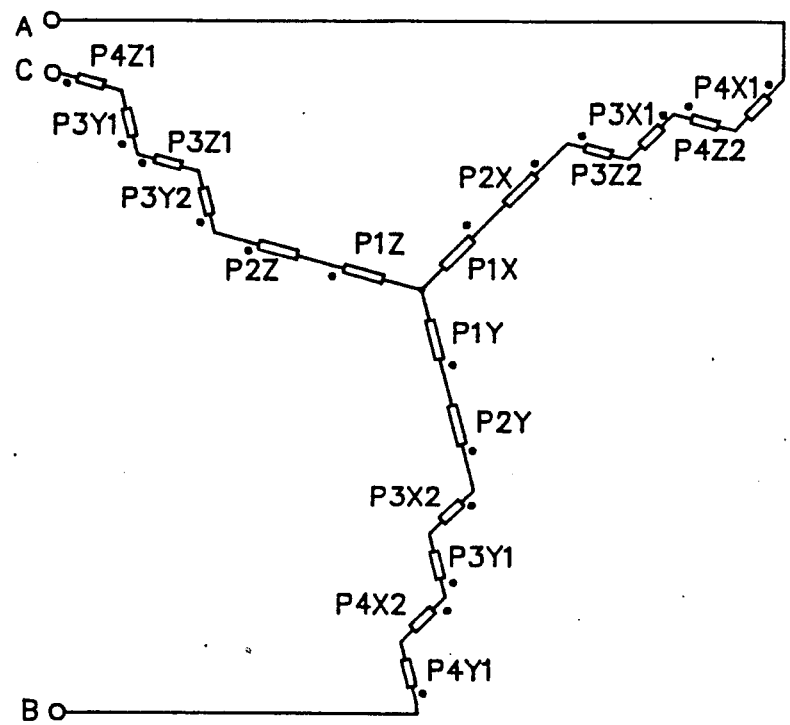
FIG. 6 illustrates a four-transformer, 12-pulse wye/double wye converter apparatus in accordance with the invention.
Figure 6:
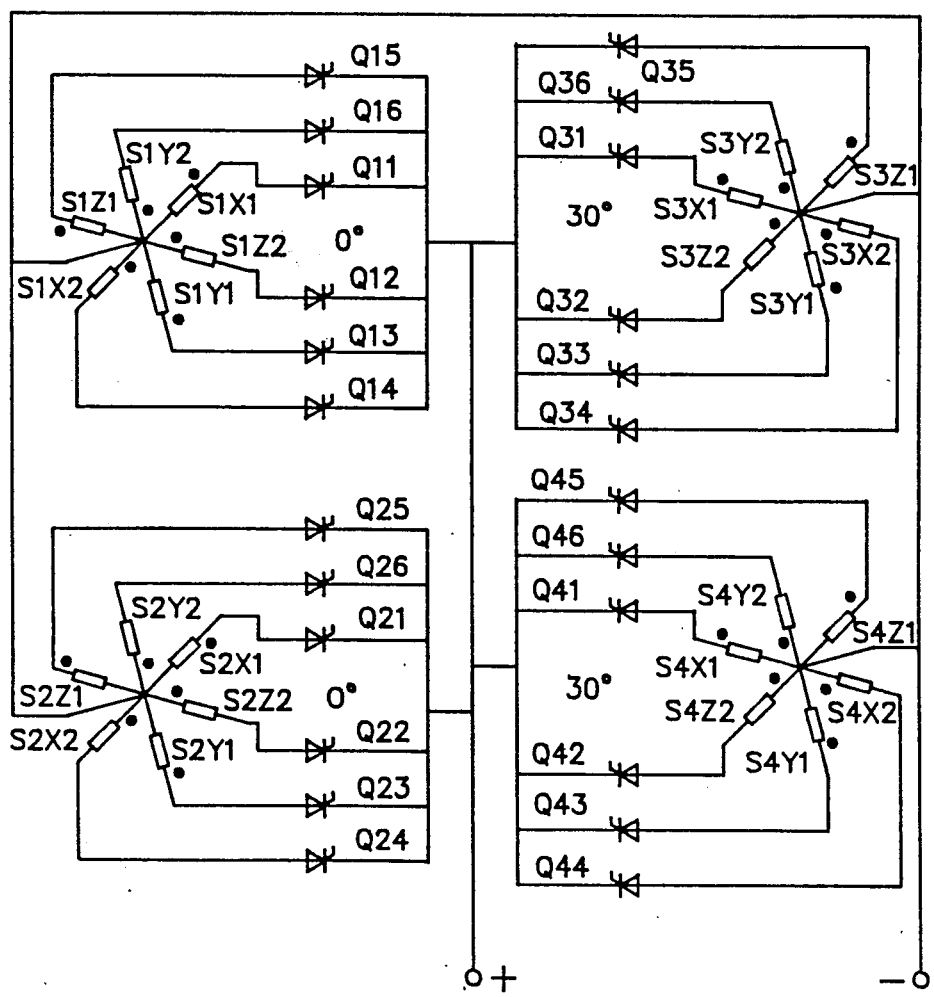

A four-transformer, 12-pulse converter apparatus is illustrated in FIG. 6. In the four transformers, two are provided with simple primaries and two are provided with zig-zag primaries. As in the previous embodiments, each transformer feeds a double-wye configuration converter arrangement. The embodiment illustrated in FIG. 6 is actually an extension of the embodiment illustrated in FIG. 2. In FIG. 6, the converter apparatus includes twice the number of transformers of a basic 12-pulse circuit, and the number of transformers can be extended to any desired number.

Figure 7:
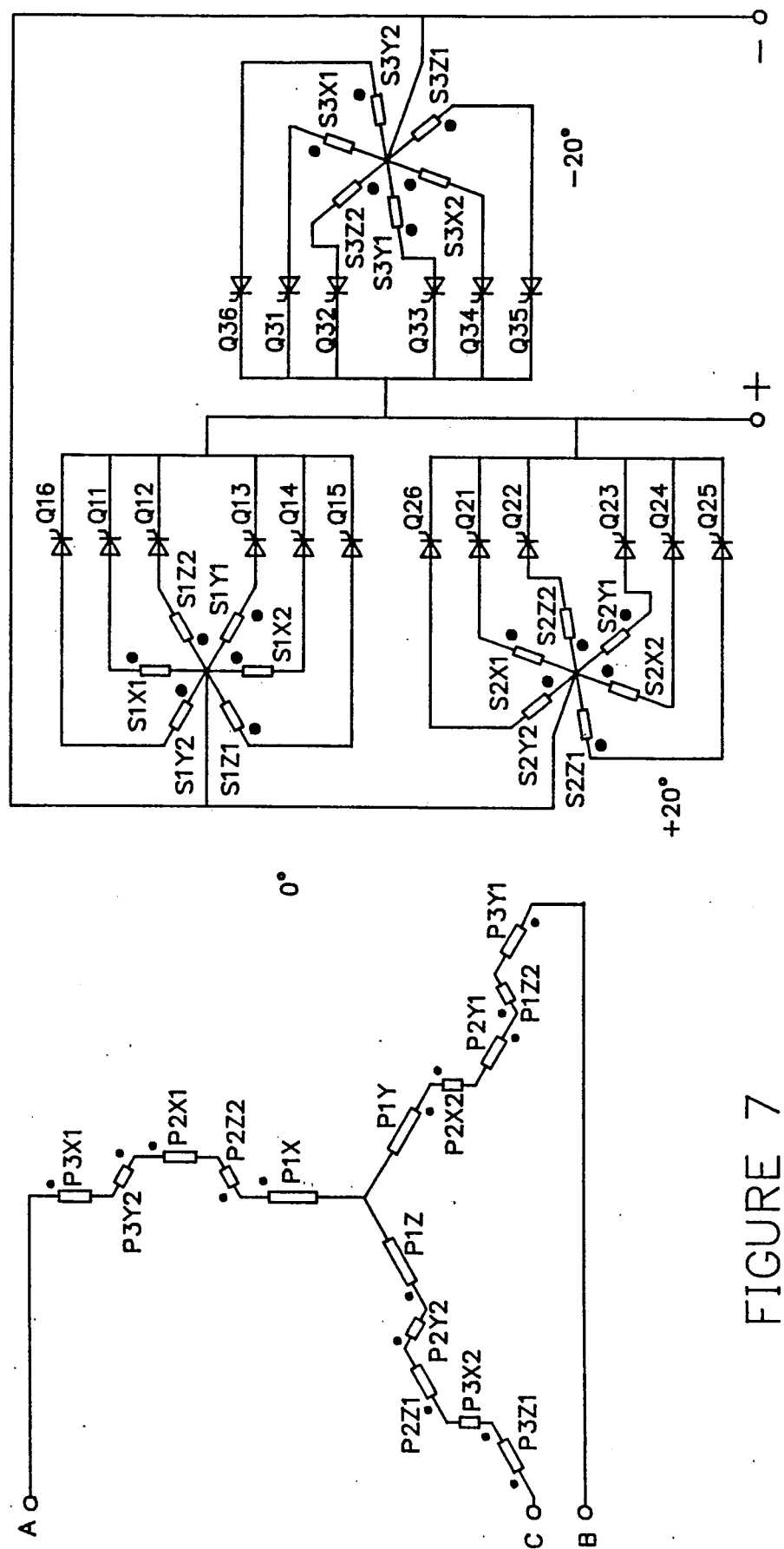
FIG. 7 illustrates a three-transformer 18-pulse wye/double wye converter apparatus in accordance with the invention.
Figure 8:
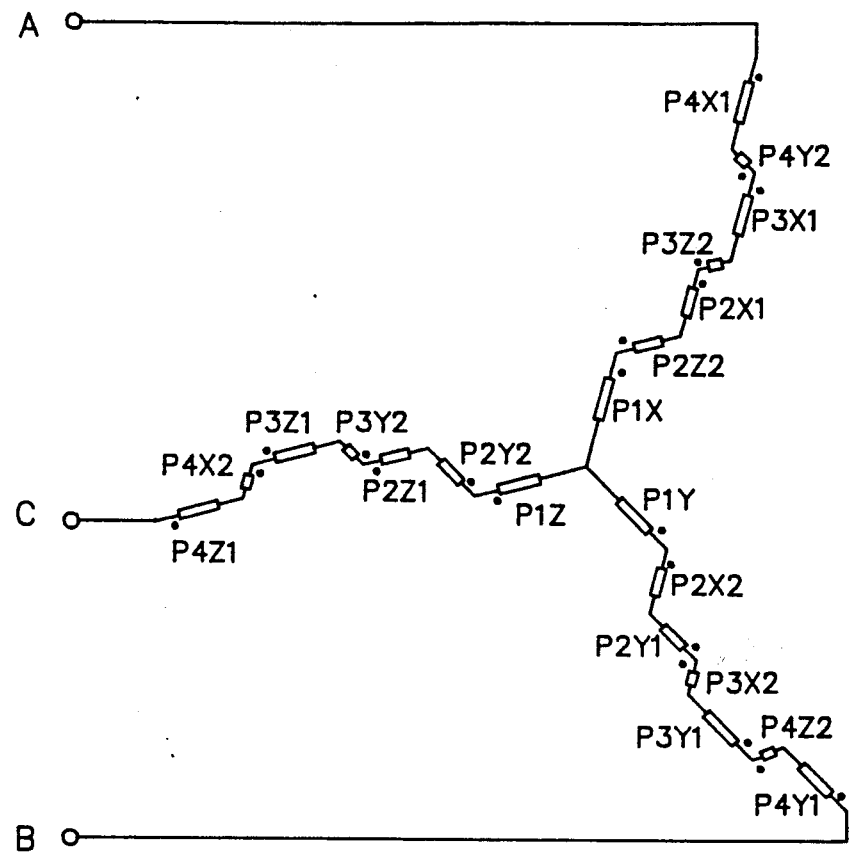
FIG. 8 illustrates a four-transformer, 24-pulse wye/double wye converter apparatus in accordance with the invention.
Figure 8:
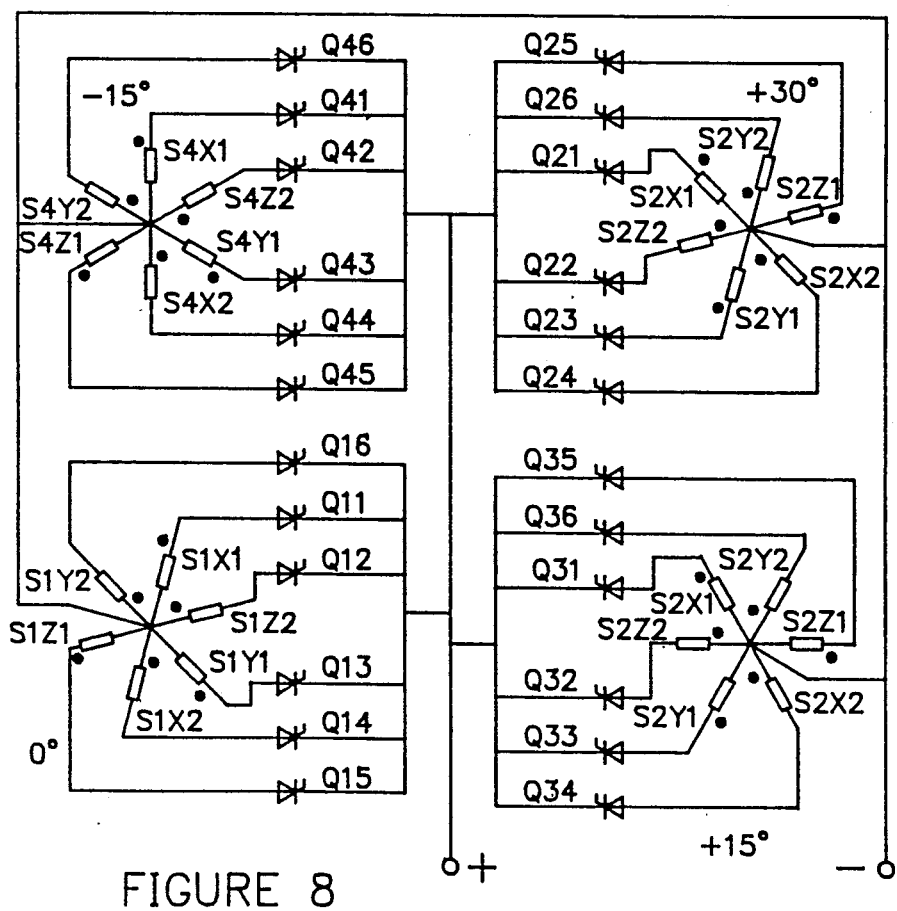

However, if the DC current is such that it cannot be handled with only two transformers without paralleling rectifier devices, the 18-pulse version, illustrated in FIG. 7, or the 24-pulse version, illustrated in FIG. 8, would be preferred to the circuit of FIG. 6. Again, the gains obtained by increasing the pulse number far exceed the problems due to the use of more complex primary windings. It should be noted that, for the 18-pulse converter, the number of simultaneously conducting diodes or thyristors is 8, and that they conduct for a period of 160 degrees, and that the average thyristor current is 1/18 of the output current. The corresponding figures for the 24-pulse converter are: 11 rectifier devices, 165 degrees and 1/24 of the output current.

In general, parameters for converter apparatus can be provided for any pulse numbers in accordance with the following criteria:
1. for an n-pulse converter:
   i. the number of transformers is $k \cdot n/6$
   ii. the number of rectifier devices is $k \cdot n$
   iii. the period of conduction is $180° (1-2/n)$
   iv. the number of conducting devices is $(n/2-1) \cdot k$
   v. the average rectifier current is $I_{total}/(n \cdot k)$
   vi. the required phase-shift for the zig-zag windings is $360°/n$
   wherein
   $k$ = any positive integer
   $n$ = an integer greater than 6
   $I_{total}$ = total DC current.

FIG. 6 illustrates a case where $n=12$ and $k=2$.

It will be apparent to one skilled in the art of converter design that the teachings herein can be expanded to any number of transformers and any pulse orders. Such expansions are, of course, within the scope of the present application.

Although several embodiments have been described, this was for the purpose of illustrating, but not limiting, the invention. Various modifications, which will come readily to the mind of one skilled in the art, are within the scope of the invention as defined in the appended claims.

We claim:
1. A power converter apparatus, comprising:
   at least two three-phase transformer arrangements including primary winding means and secondary winding means;
   said primary winding means comprising a plurality of primary windings connected in series to form a wye configuration;
   said secondary winding means comprising at least two converter arrangements, each converter arrangement comprising a plurality of secondary windings connected in a double-wye configuration, said converter arrangements being connected in parallel;
   a separate rectifier connected in series with each secondary winding of each said converter arrangements.

2. An apparatus as defined in claim 1 wherein said wye configuration comprises three legs, each leg having a first end and a second end, the first ends of the three legs being connected to each other, said primary windings being wound on said legs;
   said double-wye configuration comprises six legs, each leg having a first end and a second end, the first end of said six legs of each converter arrangement being connected to each other at a converter arrangement common point, the second ends of each leg being connected to a respective rectifier.

3. An apparatus as defined in claim 2 wherein said converter arrangement common points are connected to each other and to a point of a first polarity.

4. An apparatus as defined in claim 3 wherein each said rectifier has a first end and a second end, the second end of each leg of each converter arrangement being connected to the first end of its respective rectifier, the second ends of said rectifiers being connected to each other and to a point of a second polarity opposite to said first polarity.

5. An apparatus as defined in claim 4 wherein a single secondary winding is wound on each leg of each converter arrangement double-wye configuration.

6. An apparatus as defined in claim 5 for use as an n-pulse converter apparatus, wherein:

The number of three-phase transformer arrangement is $k \cdot n/6$ the number of rectifier is $k \cdot n$;

the period of conduction is $180° (1-2/n)$;

the number of conducting devices is $(n/2-1) \cdot k$;

the average rectifier current is $I_{total}/(n \cdot k)$; and the required phase-shift for the zig-zag windings is $360°/n$;

wherein $k$ = any positive integer $n$ = an integer greater than 6

$I_{total}$ = total DC current.

* * * * *

UNITED STATES PATENT AND TRADEMARK OFFICE
CERTIFICATE OF CORRECTION

PATENT NO.  : 5,050,058

DATED       : September 17, 1991

INVENTOR(S) : Georges-Emile April; Guy Olivier

It is certified that error appears in the above-identified patent and that said Letters Patent is hereby corrected as shown below:

```
Col 2, line 67, delete ";" and insert --.--

Col 3, line 18, delete "codes" and insert --code--
       line 27, delete "codes" and insert --code--
       line 41, after "sequence." insert --)--

Col 4, line 20, delete "and" and insert --or--
       line 39, delete "winds" and insert --windings--

Col 5, line 11, delete "12pulse" and insert --12-pulse--
       line 21, delete "phase-shaft" and insert --phase-shift--

Col 8, line 1, delete "The" and insert --the--
       line 2, after "k·n/6" insert --;--
       line 3, delete "rectifier" and insert --rectifiers--
```

Signed and Sealed this

Fourteenth Day of December, 1993

Attest:

BRUCE LEHMAN

*Attesting Officer*     *Commissioner of Patents and Trademarks*